Patented Apr. 19, 1938

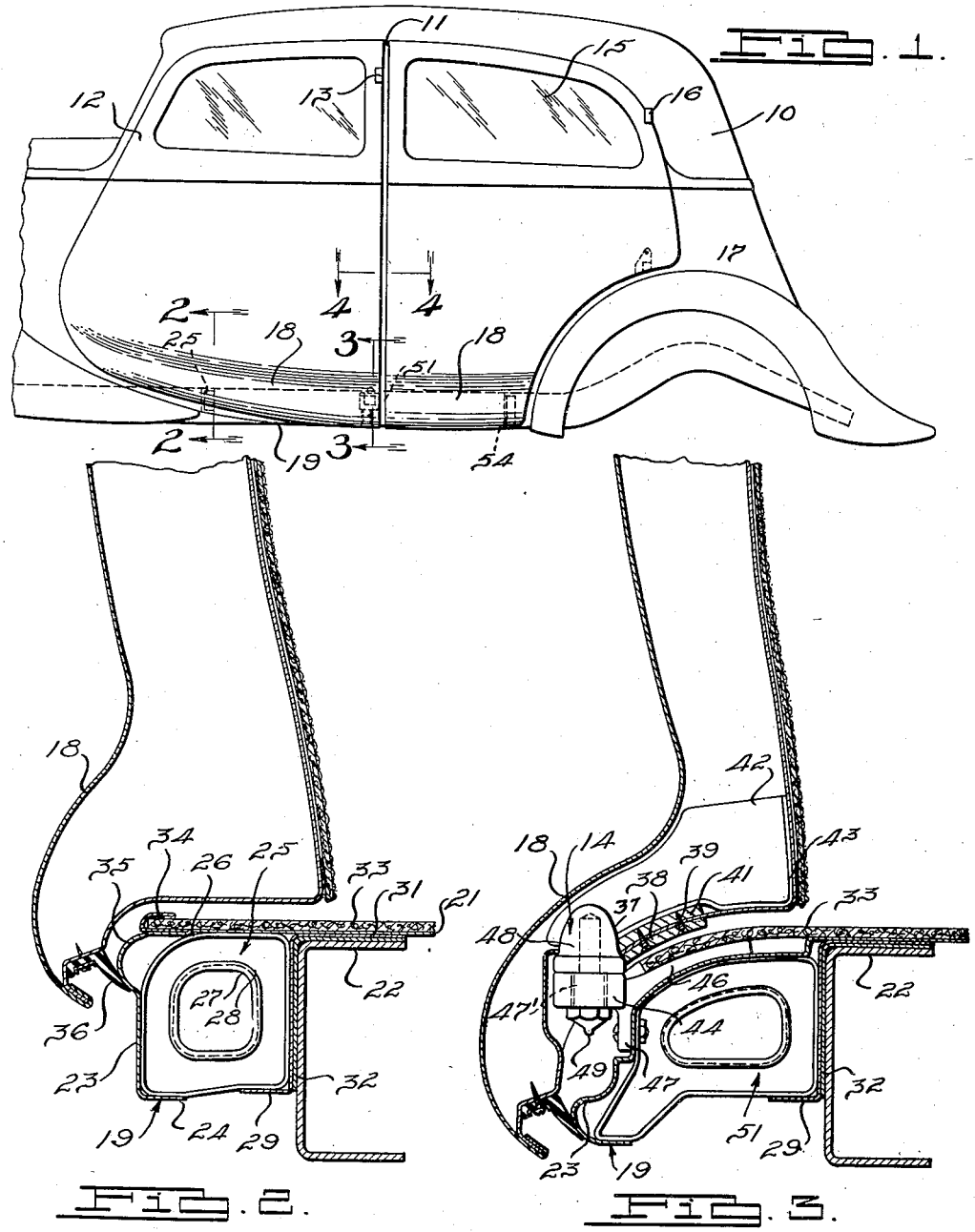

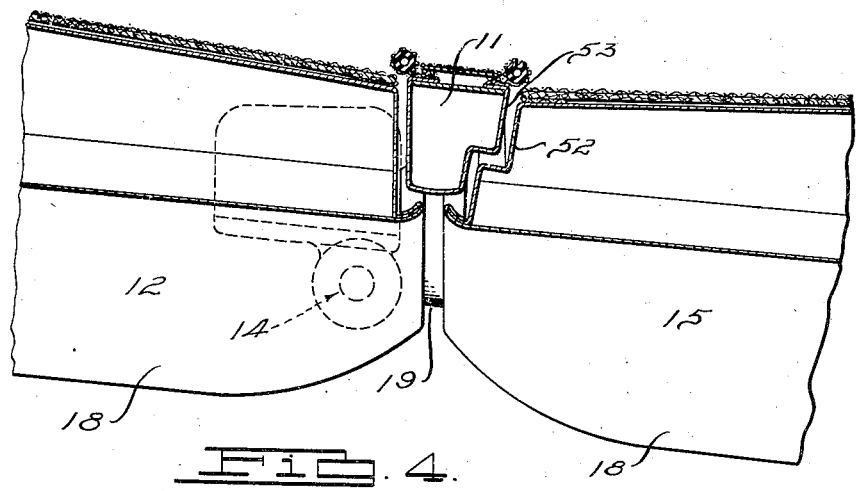
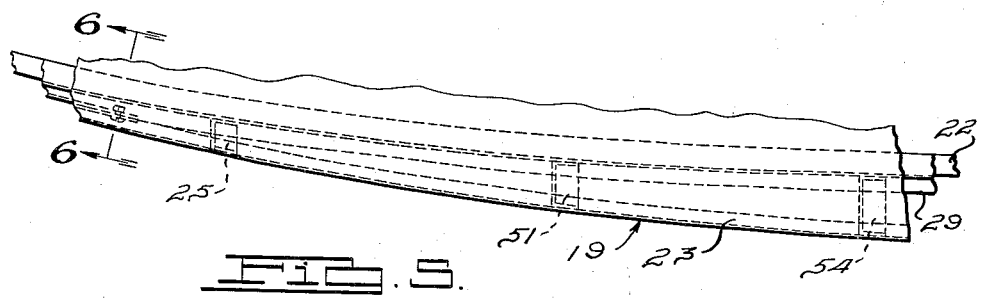
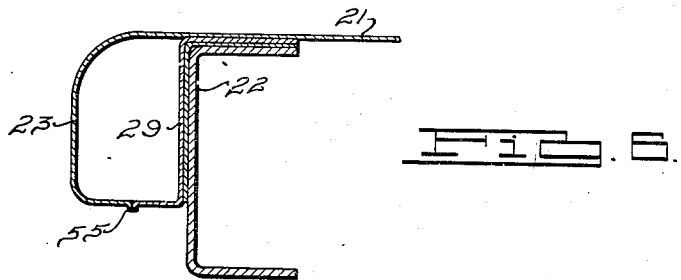

2,114,344

UNITED STATES PATENT OFFICE 2,114,344

VEHICLE DOOR AND SILL CONSTRUCTION

Alfred H. Haberstump, Detroit, Mich., assignor to The Murray Corporation of America, Detroit, Mich., a corporation of Delaware Application January 29, 1934, Serial No. 708,717

11 Claims. (Cl. 296—28)

My invention relates to vehicle bodies and particularly to the door and sill construction thereof, the latter of which is formed as a unit with the floor to extend the floor laterally of the vehicle chassis frame.

Sills have been constructed heretofore as a part of the frame of the body which rest upon the chassis frame or were supported on the sides thereof to be employed in conjunction with the running board on the side of the vehicle body. The door was disposed adjacent to the chassis frame portion of the body while the running board extended outwardly of the door.

In the present construction the sill portion of the vehicle extends laterally of the chassis frame on a plane therewith to extend the floor of the body the entire width of the vehicle to the exclusion of the running board. In this construction, the vehicle body is supported low on the sill, the floor being flush with the top of the sill so that the extra step provided by the running board is not required and is eliminated. The door may be formed to extend over the sill and provides a wider body and a cleaner body side, which is more nearly streamline. The door itself is unique in having a bulge portion at the bottom which extends over the sill and hides it from view when closed and which provides for the streamlining of the side of the vehicle.

Accordingly, the main objects of my invention are: To provide a vehicle with projecting portions at the side which extend the floor of the car laterally of the chassis frame; to strengthen the paneling of the sill by frame brackets which add material support and little weight to the sill construction; to provide a door for the vehicle which is pivoted to the sill at an extending portion at the bottom to entirely encompass the sill portion to the exclusion of the running board; to provide a concealed pintle hinge between the door and the extending sill to support the door and to have the door readily swing outwardly of the body; to provide a girder type of sill construction to the side of the body substantially of box section and which is light, durable and flush with the floor of the body, extending the floor outwardly of the chassis frame, and in general to materially widen the vehicle through the extended side sills which are rigid in construction, which are light in weight and which extend the doors laterally of the vehicle door and streamline its sides.

Other objects and features of novelty of my invention will be either specifically pointed out or will become apparent when referring, for a better understanding of my invention, to the following description taken in conjunction with the accompanying drawings, wherein:

Figure 1 is a broken view in elevation of a vehicle body embodying features of my invention, Fig. 2 is an enlarged sectional view of the structure illustrated in Fig. 1, taken on the line 2—2 thereof, Fig. 3 is an enlarged sectional view of the structure illustrated in Fig. 1, taken on the line 3—3 thereof, Fig. 4 is an enlarged sectional view of the structure illustrated in Fig. 1, taken on the line 4—4 thereof, Fig. 5 is an enlarged broken plan view of the door and sill construction of the vehicle illustrated in Fig. 1, and Fig. 6 is an enlarged sectional view of the structure illustrated in Fig. 5, taken on the line 6—6 thereof.

In Fig. 1, I have illustrated a vehicle body having two doors on each side which extend to the bottom terminal edge of the vehicle to cover the side sill extension with the running board entirely eliminated. This not only enhances the appearance of the vehicle but provides a wider floor space thereto, and streamlines the sides of the body.

The body 10 is provided with a pillar 11 disposed between the front and rear door openings. A front door 12 is mounted in the front opening pivoted to the pillar 11 by an upper hinge 13 and by a lower pintle type of hinge 14. The rear opening is enclosed by a rear door 15 mounted on an upper hinge 16 and a lower pintle type of hinge 17 inwardly of the door edge to provide sufficient distance between the hinges for swinging and supporting the door, a portion of which moves inwardly while the greater portion thereof moves outwardly. This particular construction is unique in mounting a door of streamline shape relative to the fender and wheel housing, which requires the lower portion of the door to be cut away. As illustrated in Figs. 2 and 3, the door has the paneling at the bottom thereof extended, at 18, to form the terminal edge of the lower portion of the body.

The body is constructed to have side sills 19 which are unique and novel. The bottom of the floor of the vehicle is formed of a metal sheet 21 which extends beyond a chassis frame 22 of the vehicle a material distance and which is flanged downwardly at 23 and extended inwardly at 24 about a plurality of bracing elements, one of which is illustrated at 25. The bracing elements are stamped from sheet metal to reduce their weight and have an outer flange 26 and an inner flange 27 which is flanged laterally at 28 parallel to the plane of the main web of the bracket. The bracket is extremely light while having material strength to support the paneling at the top and at the flange portions 23 and 24. A Z-shaped element 29 is secured to the bottom and inner side of the bracket elements and has an extending flange 31 which is welded or otherwise secured to underside of the floor paneling 21. Suitable sound deadening material 32 is provided between the flange and web of the chassis frame element 22 and the sill portion 19 of the body.

The floor covering, or carpet 33, is laid upon the paneling 21 having a scuff plate 34 on the edge adjacent to the doors and extends outwardly over the sill as illustrated more particularly in Fig. 2. The sill portion is outwardly curved at 35 to provide a surface with which a rubber sealing strip 36 of the door engages, to prevent the ingress of water, wind and the like into the body.

In Fig. 3, I have illustrated the hinge construction 14 for supporting the door. The hinge comprises a door socket portion 37 having an extending bracket 38 secured by suitable screws 39 to reinforcing plates 41 braced by plates 42 and 43 to strengthen the portions of the door forming the support for the element 37. On the sill portion a bracket 44 is provided, supported by arms 46 and 47 in a conventional manner having a pivot 47' screwed or otherwise retained therein with the extending pivotal end 48 mated in an aperture within the socket element 37. A teat 49 is provided on the end of the pivot 47 having an aperture therein by means of which a lubricant can be introduced to the socket 37 for the purpose of lubricating the hinge.

It will be noted in this construction, that the downwardly extending flange 23 of the side sill is preformed in a predetermined manner to receive the arms 46 and 47 of the bracket 44 to have the floor material or carpet 33 flush thereon. In a similar manner the bracket element 51 is likewise shaped differently from the bracket element 25 to provide strength to the sill and a support for the bracket 44.

In Fig. 4, I have illustrated a section of the body through the pillar 11 with the front door 12 pivoted on the lower hinge 14 and the door extending portion 18 projected over the sill 19 of the body. The rear door 15 is pivoted on the rear body portion of the vehicle, the front edge being provided with a rabbet 52 which mates with a rabbet 53 provided on the pillar. It is to be understood that the structure can be modified to have the hinges and pintle elements for the rear door also mounted on the pillar or the pillar can be entirely eliminated by constructions as illustrated and described in the co-pending applicacation of F. J. Westrope, Serial No. 704,813, filed January 2, 1934, now Patent #2,084,069 dated June 15, 1937, and assigned to the assignee of the present invention.

In Fig. 5, I have shown a complete sill construction wherein a rear bracket 54, a central bracket 51 and a front bracket 25 are disposed to be engaged by the web portions 23 and 24 of the extended floor panel 21 and by the Z-shaped inner element 29 which meet frontwardly of the bracket 25, as illustrated more particularly in Fig. 6. The mating edges may be bolted, welded or otherwise secured at 55 or the outer panel may be flanged around on itself to engage its underside in lieu of the Z-shaped element 29. In any of the suggested constructions, a material strength is added to the sill while maintaining its weight at a minimum through the employment of the pressed out bracket elements 25, 51, and 54 which are formed from metal sheet in such manner as to provide maximum strength.

The sill extends the floor materially beyond that heretofore provided and entirely eliminates the running boards. The body may be disposed on the chassis frame in the lowest possible manner to retain the floor flush with the top of the chassis frame and, in view of the lowered position of the body, the running board is no longer needed. By having the door extend over the sill, the streamlining of the side of the body between the fenders is effected and the appearance of the body is materially enhanced.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. The combination with the chassis frame of a vehicle body, of a floor for the body extending thereacross and projecting beyond the marginal edge of the chassis sides and flanged downwardly, angle members engaging the bottom of the floor and extending downwardly to closely engage the chassis frame and spaced from the downwardly extending flanges of the floor, and spaced brackets disposed between said downwardly extending flanges of the floor and angle members and secured thereto.

2. The combination with the chassis frame of a vehicle body, of a floor for the body extending thereacross and projecting beyond the marginal edge of the chassis sides and flanged downwardly, angle members engaging the bottom of the floor and extending downwardly to closely engage the sides of the chassis frame and spaced from the downwardly extending flange of the floor, spaced brackets disposed between said downwardly extending flange of the floor and angle members and secured thereto to form sills, and a door for said body having a laterally extending bottom portion which substantially encompasses said sill.

3. The combination with the chassis frame of a vehicle body, of a floor for the body extending thereacross and projecting beyond the marginal edge of the chassis sides and flanged downwardly, angle members engaging the bottom of the floor and extending downwardly to closely engage the chassis frame and spaced from the downwardly extending flanges of the floor, spaced brackets disposed between said downwardly extending flanges of the floor and angle members and secured thereto to form sills, a door for said body having a laterally extending bottom portion which substantially encompasses said sill, and a pivotal element secured between said outwardly projecting portion of the door and said sill upon which said door may swing.

4. In combination with a chassis frame of a vehicle body, a floor element for said body extending laterally of said frame, and bracing elements engaging and supporting said laterally extending portions and forming therewith sills for the body, said sills spanning said chassis frame at the sides and having the floor therebetween resting upon the top of said frame.

5. In combination with a chassis frame of a vehicle body, a floor element for said body extending laterally of said frame, bracing elements engaging and supporting said laterally extending portions and forming therewith sills for the body, said sills spanning said chassis frame at the sides and having the floor therebetween resting upon the top of said frame, and a door for said body extending above said sill and having an outwardly projecting bottom portion which encompasses said sill.

6. In combination with a chassis frame of a vehicle body, a floor element for said body extending laterally of said frame, bracing elements engaging and supporting said laterally extending portions and forming therewith sills for the body, said sills spanning said chassis frame at the sides and having the floor therebeween resting upon the top of said frame, a door for said body extending above said sill and having an outwardly projecting bottom portion which encompasses said sill, and a pivotal element disposed within the confines of said door structure and on said sill to be entirely hidden from view.

7. The combination with a sill of a chassis frame of an automobile, of a body therefor having a floor portion made of sheet metal which projects laterally beyond the frame to extend the floor of the body therebeyond, bracing means extending laterally of the chassis frame for supporting said extending floor, and a laterally extending angle member secured to the inner portion of said bracing means and to the floor for forming a box section sill structure with the laterally extending portion of the floor.

8. The combination with a sill of a chassis frame of an automobile, of a body therefor having a floor portion made of sheet metal which projects laterally beyond the frame to extend the floor of the body therebeyond, bracing means extending laterally of the chassis frame for supporting said extending floor, a longitudinally extending angle member secured to the inner portion of said bracing means and to the floor for forming a box section sill structure with the laterally extending portion of the floor, and a door for said body having the bottom thereof encompassing said sill.

9. The combination with a sill of a chassis frame of an automobile, of a body therefor having a floor portion made of sheet metal which projects laterally beyond the frame to extend the floor of the body therebeyond, bracing means extending laterally of the chassis frame for supporting said extending floor, a longitudinally extending angle member secured to the inner portion of said bracing means and to the floor for forming a box section sill structure with the laterally extending portion of the floor, a door for said body so extended laterally as to encompass said sill, and a pivoted member disposed between said door and said sill and completely hidden from view.

10. A sill for a vehicle body including, a floor having its lateral edges extended downwardly, angle shaped members spaced from said edges, and girder elements spaced apart and secured to said members and edges to form a braced box section sill construction.

11. The combination with a chassis frame of an automobile of a body therefor having a floor portion made of sheet metal which projects laterally and extends downwardly beyond each side of the chassis frame, downwardly projected angle elements disposed adjacent to said chassis frame, and bracing elements extending between said projected and extended floor portions and said elements.

ALFRED H. HABERSTUMP.